United States Patent
Li et al.

(10) Patent No.: US 11,144,546 B2
(45) Date of Patent: Oct. 12, 2021

(54) DYNAMICALLY SELECTING A DATA ACCESS PATH TO IMPROVE QUERY PERFORMANCE

(71) Applicant: INTERNATIONAL BUSINESS MACHINES CORPORATION, Armonk, NY (US)

(72) Inventors: Shuo Li, Beijing (CN); Xiaobo Wang, Beijing (CN); ShengYan Sun, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 16/789,999

(22) Filed: Feb. 13, 2020

(65) Prior Publication Data

US 2021/0256021 A1      Aug. 19, 2021

(51) Int. Cl.
   *G06F 16/2453*   (2019.01)
   *G06F 16/2455*   (2019.01)
   *G06F 16/27*     (2019.01)
   *G06F 16/22*     (2019.01)
   *G06F 16/2452*   (2019.01)
   *G06F 16/248*    (2019.01)

(52) U.S. Cl.
   CPC ...... *G06F 16/2453* (2019.01); *G06F 16/2228* (2019.01); *G06F 16/248* (2019.01); *G06F 16/2455* (2019.01); *G06F 16/24524* (2019.01); *G06F 16/278* (2019.01)

(58) Field of Classification Search
   CPC ............. G06F 16/2453; G06F 16/2228; G06F 16/2455; G06F 16/24524; G06F 16/278; G06F 16/248

USPC ......................................................... 707/713
See application file for complete search history.

(56) References Cited

U.S. PATENT DOCUMENTS 6,006,220 A  * 12/1999 Haderle ............ G06F 16/24545
6,470,330 B1 * 10/2002 Das ..................... G06F 16/2462
                                                           707/718
(Continued)

OTHER PUBLICATIONS

Murthy, Keshav; Approaches to Query Optimization in NoSQL; Database Zone-Tutorial; https://dzone.com/articles/approaches-to-query-optimization-in-nosql-1; May 8, 2019; 12 pages.

*Primary Examiner* — Hanh B Thai
(74) *Attorney, Agent, or Firm* — Schmeiser, Olsen & Watts; Stephanie Carusillo (57) ABSTRACT

An approach is provided for accessing data in a database. A query which accesses item(s) in the data is received. The query has multiple conditions whose execution produces a final result. Amounts of filtering of portions of the data caused by utilizing different types of indexes to filter the portions are determined. Greatest amounts of filtering for the portions are determined. Types of indexes are selected so that a utilization of a given type of index causes a greatest amount of filtering for a given portion. Data access methods for the portions of data are generated. During runtime, process tasks are generated for the multiple conditions in the query. An execution flow is controlled. The execution flow executes the process tasks by utilizing the data access methods to generate initial results. The final result of the query is generated by combining the initial results from the process tasks.

20 Claims, 7 Drawing Sheets

(56) References Cited

U.S. PATENT DOCUMENTS

| | | | |
|---|---|---|---|
| 8,055,773 B2* | 11/2011 | Breiter | G06F 9/5038 |
| | | | 709/226 |
| 8,744,994 B2 | 6/2014 | Chen | |
| 9,177,027 B2* | 11/2015 | Kitsuregawa | G06F 16/24524 |
| 9,430,552 B2 | 8/2016 | Adya | |
| 9,842,000 B2 | 12/2017 | Bishop | |
| 10,942,778 B2* | 3/2021 | Sandstrom | G06F 9/4881 |
| 2008/0109806 A1* | 5/2008 | Breiter | G06F 9/5038 |
| | | | 718/101 |
| 2013/0139165 A1* | 5/2013 | Doukhvalov | G06F 21/567 |
| | | | 718/102 |
| 2015/0370853 A1* | 12/2015 | Lee | G06F 16/2453 |
| | | | 707/718 |
| 2017/0228420 A1* | 8/2017 | Li | G06F 16/24524 |
| 2018/0143975 A1* | 5/2018 | Casal | G06F 40/58 |
| 2019/0034485 A1 | 1/2019 | Arnold | |
| 2019/0258632 A1* | 8/2019 | Pal | G06F 16/2465 |
| 2019/0258636 A1* | 8/2019 | Bhattacharjee | G06F 16/2228 |
| 2019/0258637 A1* | 8/2019 | Bhattacharjee | G06F 16/24549 |
| 2019/0272271 A1* | 9/2019 | Bhattacharjee | G06F 16/2455 |
| 2019/0310977 A1* | 10/2019 | Pal | G06F 16/2228 |
| 2019/0384846 A1* | 12/2019 | Mathur | G06F 16/221 |
| 2020/0050586 A1* | 2/2020 | Pal | G06F 16/13 |
| 2020/0050607 A1* | 2/2020 | Pal | G06F 9/4881 |

* cited by examiner

DYNAMICALLY SELECTING A DATA ACCESS PATH TO IMPROVE QUERY PERFORMANCE

BACKGROUND

The present invention relates to managing query execution, and more particularly to selecting an index for accessing data.

In conventional search techniques, performing a search for data in a NoSQL database or a relational database uses multiple conditions. One traditional search method performs a search using every search term and combines search results using logic operators, such as OR, AND, or NOT. Different fields in a database may be indexed using different index types.

SUMMARY

In one embodiment, the present invention provides a method of accessing data in a database. The method includes receiving, by one or more processors, a query which accesses one or more items included in data in a database. The query has multiple conditions whose execution produces a final result of the query. The method further includes determining, by the one or more processors, amounts of filtering of portions of the data in the database caused by utilizing different types of indexes to filter the portions, respectively. The method further includes determining, by the one or more processors, respective greatest amounts of filtering for the portions, the greatest amounts of filtering being included in the amounts of filtering. The method further includes selecting, by the one or more processors, respective types of indexes so that a utilization of a given type of index causes a greatest amount of filtering for a given portion. The method further includes based on the selected types of indexes, generating, by the one or more processors, respective data access methods for the portions of the data. The method further includes during runtime, generating, by the one or more processors, respective process tasks for the multiple conditions in the query. The method further includes controlling, by the one or more processors, an execution flow that executes the process tasks by utilizing the respective data access methods to generate respective initial results. The method further includes generating, by the one or more processors, the final result of the query by combining the initial results from the process tasks.

In another embodiment, the present invention provides a computer program product which includes a computer readable storage medium having computer readable program code stored on the computer readable storage medium. The computer readable program code is executed by a central processing unit (CPU) of a computer system to cause the computer system to perform a method analogous to the method summarized above.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method analogous to the method summarized above.

DETAILED DESCRIPTION

Overview

Known search methods that access data in a database using every search term in multiple conditions in a query and combine search results using a join clause causes a decrease in query performance. The decreasing query performance may include an increase in execution time for the query (i.e., an increase in the time taken to retrieve data) and an increase in CPU load on the database server. Furthermore, the complexity of the aforementioned query increases, which leads to an increased cost in optimizing the query to determine how to process the query in the fastest manner. As different fields are indexed using different types of indexes, the aforementioned disadvantages of accessing the data are worsened.

Embodiments of the present invention address the aforementioned unique challenges of accessing the data in the database by improving the query process performance by using different, most efficient access methods for different parts of the query, where a given access method for a given part of the query is selected by determining the index that provides the greatest amount of filtering for the given part of the query.

System for Accessing Data in a Database

Figure 1:
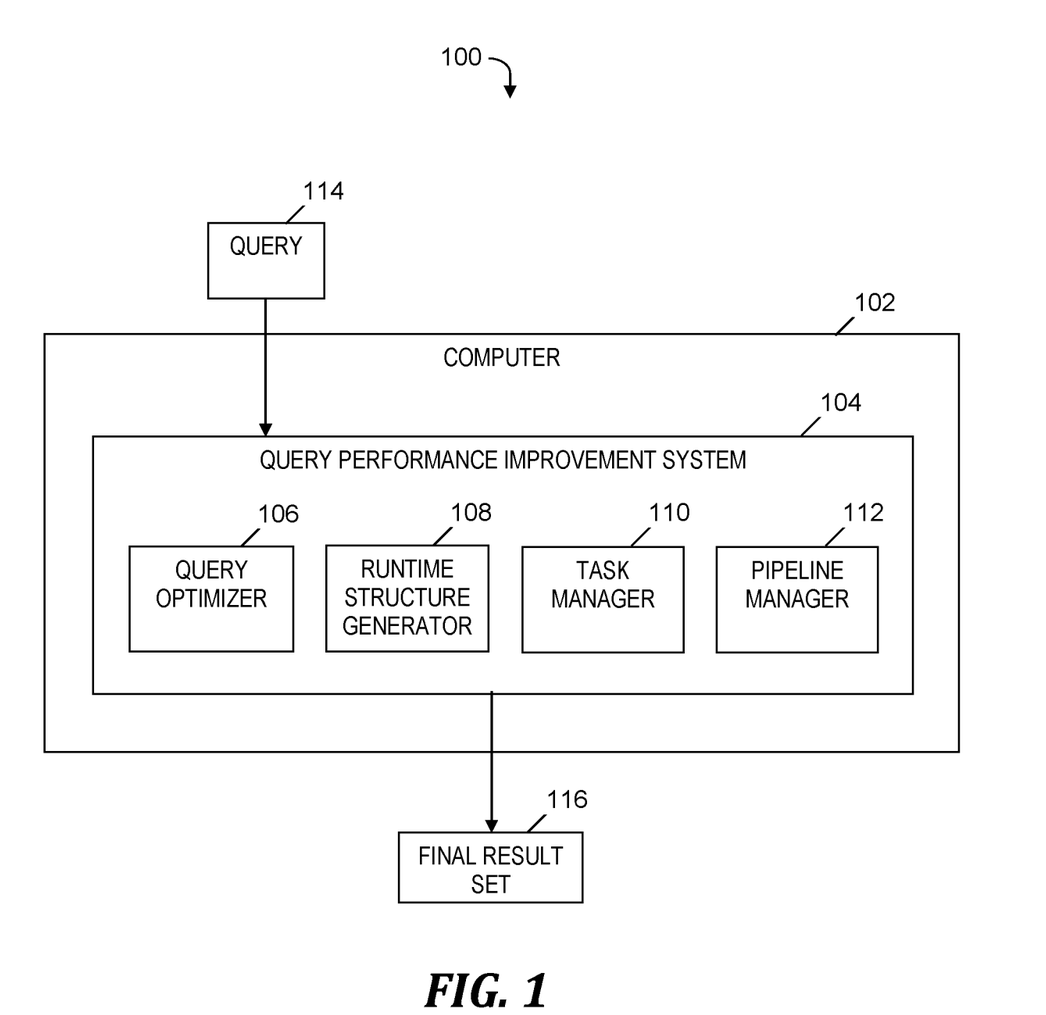
FIG. 1 is a block diagram of a system for accessing data in a database, in accordance with embodiments of the present invention.

FIG. 1 is a block diagram of a system 100 for accessing data in a database, in accordance with embodiments of the present invention. System 100 includes a computer 102, which executes a software-based query performance improvement system 104, which includes a single query optimizer 106, a runtime structure generator 108, a task manager 110 and a pipeline manager 112. Query performance improvement system 104 receives a query 114 which includes multiple conditions.

Query optimizer 106 determines how query 114 is executed by selecting different indexes to be utilized for respective parts of query 114. Query optimizer 106 determines deviation parts for data in a database being accessed by query 114 and builds access paths for the different parts. Runtime structure generator 108 builds different process tasks (also known as child tasks) for respective parts of query 114. In one embodiment, the aforementioned parts of query 114 include respective conditions included in query 114. In one embodiment, the conditions are included in a WHERE clause in query 114.

Runtime structure generator 108 generates task relationships (i.e., relationships between process tasks and parts of the query 114 in FIG. 1 or between an originating task specified by the query 114 in FIG. 1 and the process tasks). Based on the task relationships, runtime structure generator 108 generates a runtime structure for the process tasks. The control of the execution flow by the runtime environment is based on the runtime structure generated by runtime structure generator 108.

A runtime environment (not shown) executes an execution plan for the process tasks and controls an execution flow for the process tasks. Task manager 110 manages the process tasks. Pipeline manager 112 controls data flow from the process tasks and passes data from the process tasks to a parent task (i.e., an originating task specified by query 114). Pipeline manager 112 receives initial results from the process tasks and combines the initial results to generate a final result set 116. Pipeline manager 112 sends final result set 116 to the parent task.

For example, query 114 includes:
SELECT*FROM HIPPO
WHERE GEO=X
AND TEXT=Y

For a parent task specified by the example of query 114 presented above, query optimizer 106 chooses a geospatial index for a first part of query 114 (i.e., GEO=X) and a full text index for a second part of query 114 (i.e., TEXT=Y). Query optimizer 106 generates a first process task for the first part of query 114, where the first process task includes SELECT GEO=X and uses the geospatial index to access data in the database that satisfies the SELECT GEO=X statement. Query optimizer 106 generates a second process task for the second part of query 114, where the second process task includes SELECT TEXT=Y and uses the full text index to access data in the database that satisfies the SELECT TEXT=Y statement.

Figure 2:
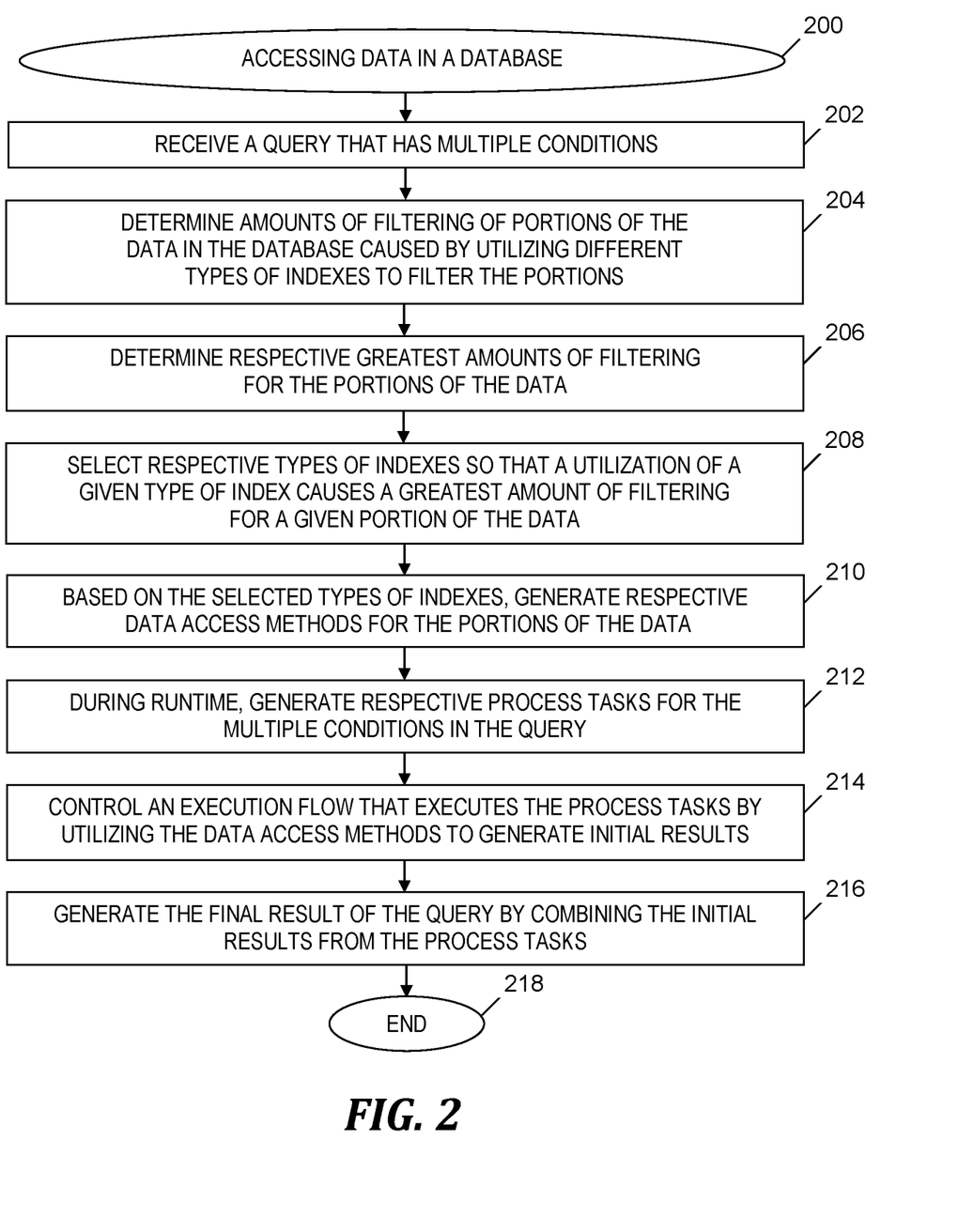
FIG. 2 is a flowchart of a process of accessing data in a database, where the process is implemented in the system of FIG. 1, in accordance with embodiments of the present invention.
Figure 3:
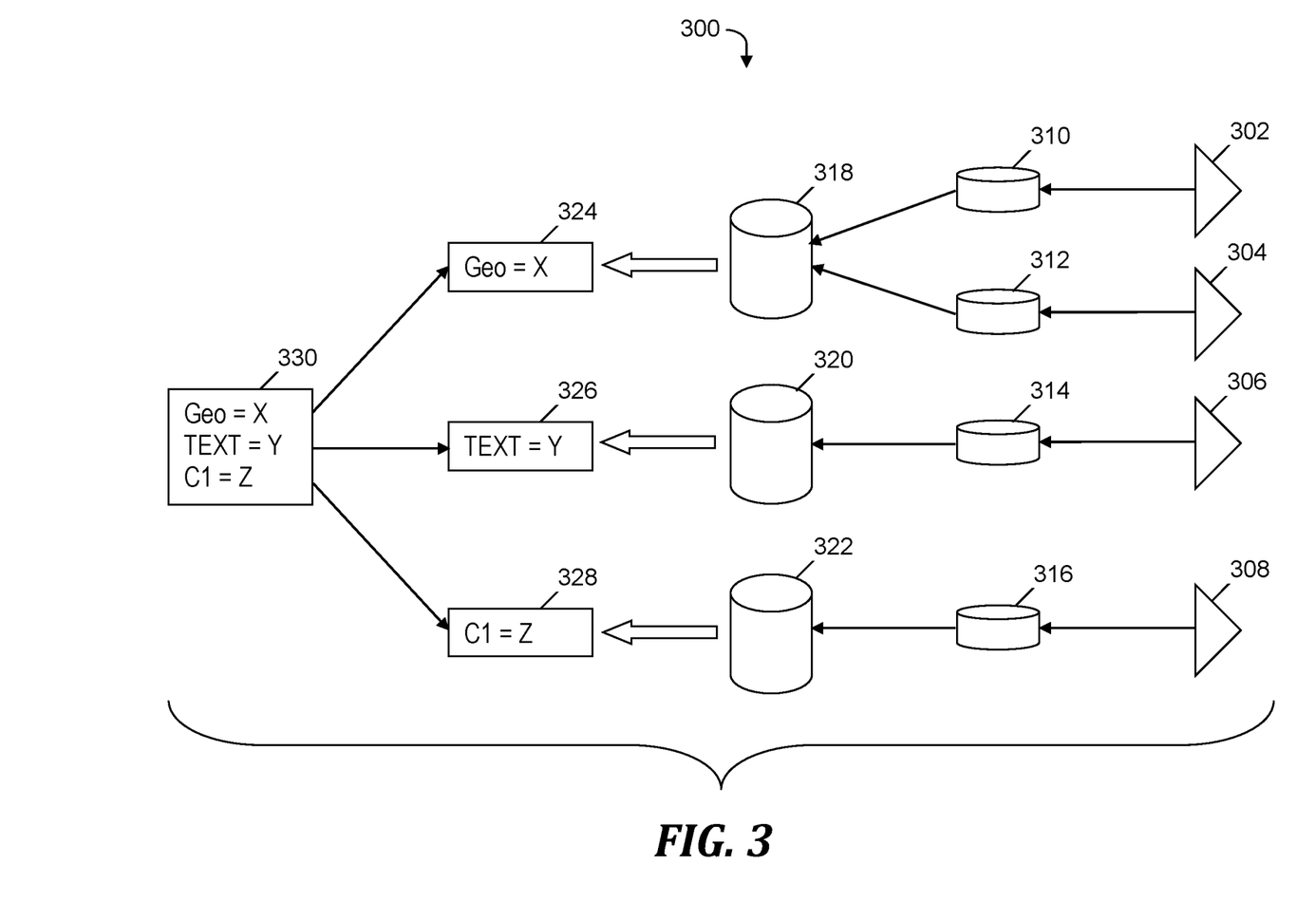
FIG. 3 is an example of generating process tasks divided by partition, where the generation of the execution tasks is included in the process of FIG. 2, in accordance with embodiments of the present invention.

The functionality of the components shown in FIG. 1 is described in more detail in the discussion of FIG. 2 and FIG. 3 presented below.

Process for Accessing Data in a Database

FIG. 2 is a flowchart of a process of accessing data in a database, where the process is implemented in the system of FIG. 1, in accordance with embodiments of the present invention. The process of FIG. 2 starts at step 200. In step 202, query performance improvement system 104 (see FIG. 1) receives query 114 (see FIG. 1).

In step 204, query performance improvement system 104 (see FIG. 1) determines amounts of filtering of portions of the data in the database caused by utilizing different types of indexes to filter the portions.

In step 206, query performance improvement system 104 (see FIG. 1) determines respective greatest amounts of filtering for the portions of the aforementioned data. In one embodiment, query performance improvement system 104 (see FIG. 1) generates access paths for respective portions of the data so that the access paths are in one-to-one correspondence with the greatest amounts of filtering for the portions.

In step 208, query performance improvement system 104 (see FIG. 1) selects respective types of indexes so that a utilization of a given selected type of index causes a greatest amount of filtering for a given portion of the data. In one embodiment, the aforementioned access paths are in correspondence with the types of indexes selected in step 208.

In step 210, based on the types of indexes selected in step 208, query performance improvement system 104 (see FIG. 1) generates respective data access methods for the portions of the data. In one embodiment, query performance improvement system 104 receives statistics prior to step 210 and the generation of data access methods is based in part on the received statistics. In one embodiment, the statistics include a combination of the number of records, the number of pages, average record length, a degree of clustering of table rows to the index order, and page fetch estimates for different buffer pool sizes.

In one embodiment, steps 208 and 210 include query performance improvement system 104 (see FIG. 1) dynamically selecting the types of indexes and the access paths so that query execution performance is improved by generating more efficient access methods specified by the selected types of indexes and by decreasing the amount of system resources used by the query execution.

In step 212, during runtime, query performance improvement system 104 (see FIG. 1) generates respective process tasks (also known as execution tasks or runtime tasks) for the multiple conditions in query 114 (see FIG. 1).

In step 214, query performance improvement system 104 (see FIG. 1) controls an execution flow that executes the process tasks generated in step 212. The execution of the process tasks includes performing the data access methods generated in step 210, which generates initial results. The initial results can be in a specified order or in no order.

In step 216, query performance improvement system 104 (see FIG. 1) generates final result set 116 (see FIG. 1) by combining the initial results generated in step 214. Final result set 116 (see FIG. 1) is in a specified order or in no order. Final result set 116 (see FIG. 1) is generated in the specified order if the initial results are generated in the specified order in step 214. Query performance improvement system 104 (see FIG. 1) sends the final result set 116 (see FIG. 1) to the parent task. Following step 216, the process of FIG. 2 ends at step 218. The process of FIG. 2 improves upon traditional data access techniques by (i) utilizing more efficient access methods (i.e., using methods that use indexes that cause the most filtering for corresponding portions of data) and (ii) reducing database system resource usage by using less costly access paths for different portions of the data (i.e., use access paths that use fewer system resources).

In one embodiment, steps 202, 204, 206, 208, and 210 are performed by query optimizer 106 (see FIG. 1), step 212 is performed by runtime structure generator 108 (see FIG. 1), step 214 is performed by a runtime environment, and step 216 is performed by pipeline manager 112 (see FIG. 1).

In one embodiment, query performance improvement system 104 (see FIG. 1) divides the data in the database into partitions so that the partitions are non-overlapping and so that the partitions collectively include the data in the database in its entirety. The query performance improvement system 104 (see FIG. 1) divides an originating task (i.e., a parent task) specified by query 114 (see FIG. 1) into multiple process tasks (i.e., children tasks) so that each process task is associated with a corresponding partition included in the aforementioned partitions of the data.

In one embodiment, query performance improvement system 104 (see FIG. 1) determines that the indexes have identical prefixes and in response thereto, divides the data in the database into non-overlapping key ranges. The query performance improvement system 104 (see FIG. 1) divides an originating task specified by query 114 (see FIG. 1) into multiple process tasks so that each process task is associated with a corresponding key range included in the non-overlapping key ranges.

Examples

FIG. 3 is an example 300 of generating process tasks divided by partition, where the generation of the execution tasks is included in the process of FIG. 2, in accordance with embodiments of the present invention. Example 300 includes links 302, 304, 306, and 308 to a noSQL database. Example 300 includes logic deviations 310, 312, 314, and 316 generated by query optimizer 106 (see FIG. 1) such that a geospatial index is used to access data via links 302 and 304, a full text index is used to access data via link 306, and a b-tree index is used to access data via link 308. Query optimizer 106 (see FIG. 1) generates logic deviations 310, 312, 314, and 316 so that the data in the database is divided into partitions or portions, where the partitions have no overlapping data items (i.e., the same data item is not included in more than one partition) and where there are no gaps left by the partitions (i.e., the partitions collectively include the data in the database in its entirety).

Runtime structure generator 108 (see FIG. 1) generates work parts 318, 320, and 322 in which a runtime structure is generated and execution tasks 324, 326, and 328 are generated. Runtime structure generator 108 (see FIG. 1) generates execution tasks 324, 326, and 328 by using the conditions included in an originating task 330. Pipeline manager 112 (see FIG. 1) combines the initial results produced by execution tasks 324, 326, and 328 to generate final result set 116 (see FIG. 1).

Figure 4:
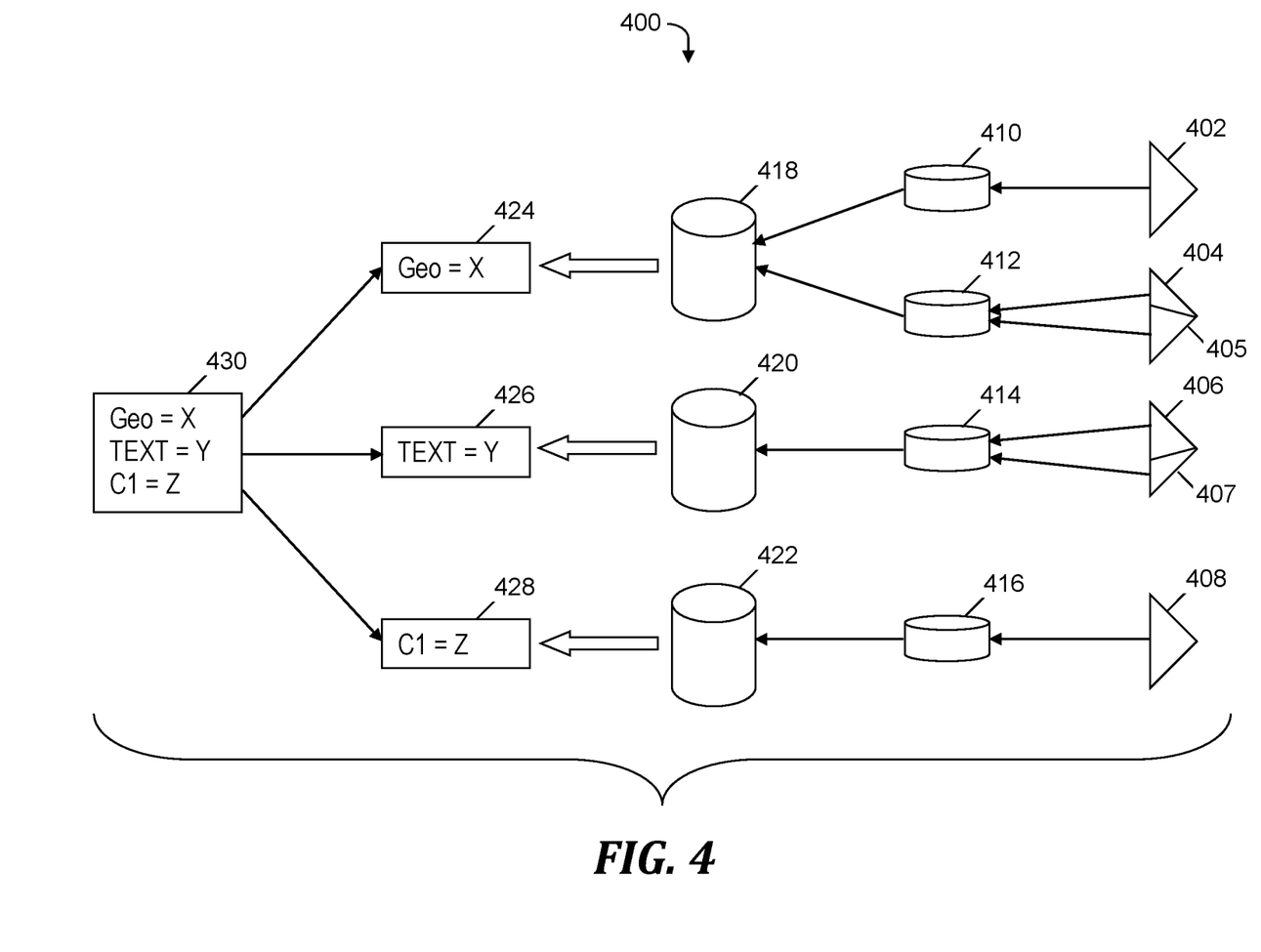
FIG. 4 is an example of generating process tasks divided by key range, where the generation of the execution tasks is included in the process of FIG. 2, in accordance with embodiments of the present invention.

FIG. 4 is an example 400 of generating process tasks divided by key range, where the generation of the execution tasks is included in the process of FIG. 2, in accordance with embodiments of the present invention. Example 400 includes links 402, 404, 405, 406, 407, and 408 to a noSQL database. Example 400 includes logic deviations 410, 412, 414, and 416 generated by query optimizer 106 (see FIG. 1) where the access degree is 3 and such that a first index is used to access data via links 402 and 404 (i.e., the index specified by IX1 (C1, Geo)), a second index is used to access data via links 405 and 406 (i.e., the index specified by IX1 (C1, Text)), and a third is used to access data via links 407 and 408 (i.e., the index specified by IX1 (C1, C2)). Query optimizer 106 (see FIG. 1) generates logic deviations 410, 412, 414, and 416 so that the data in the database (i.e., access groups) is divided by key range. Query optimizer 106 (see FIG. 1) generates logic deviations 410, 412, 414, and 416 so that the data in the database is divided into different paths with no overlaps and no gaps, where overlaps and gaps are described above relative to FIG. 3.

Runtime structure generator 108 (see FIG. 1) generates work parts 418, 420, and 422 in which a runtime structure is generated and execution tasks 424, 426, and 428 are generated. Runtime structure generator 108 (see FIG. 1) generates execution tasks 424, 426, and 428 by using the conditions included in an originating task 430 and dividing the tasks by key range based on the indexes having the same prefix. Pipeline manager 112 (see FIG. 1) combines the initial results produced by execution tasks 424, 426, and 428 to generate final result set 116 (see FIG. 1).

Figure 5:
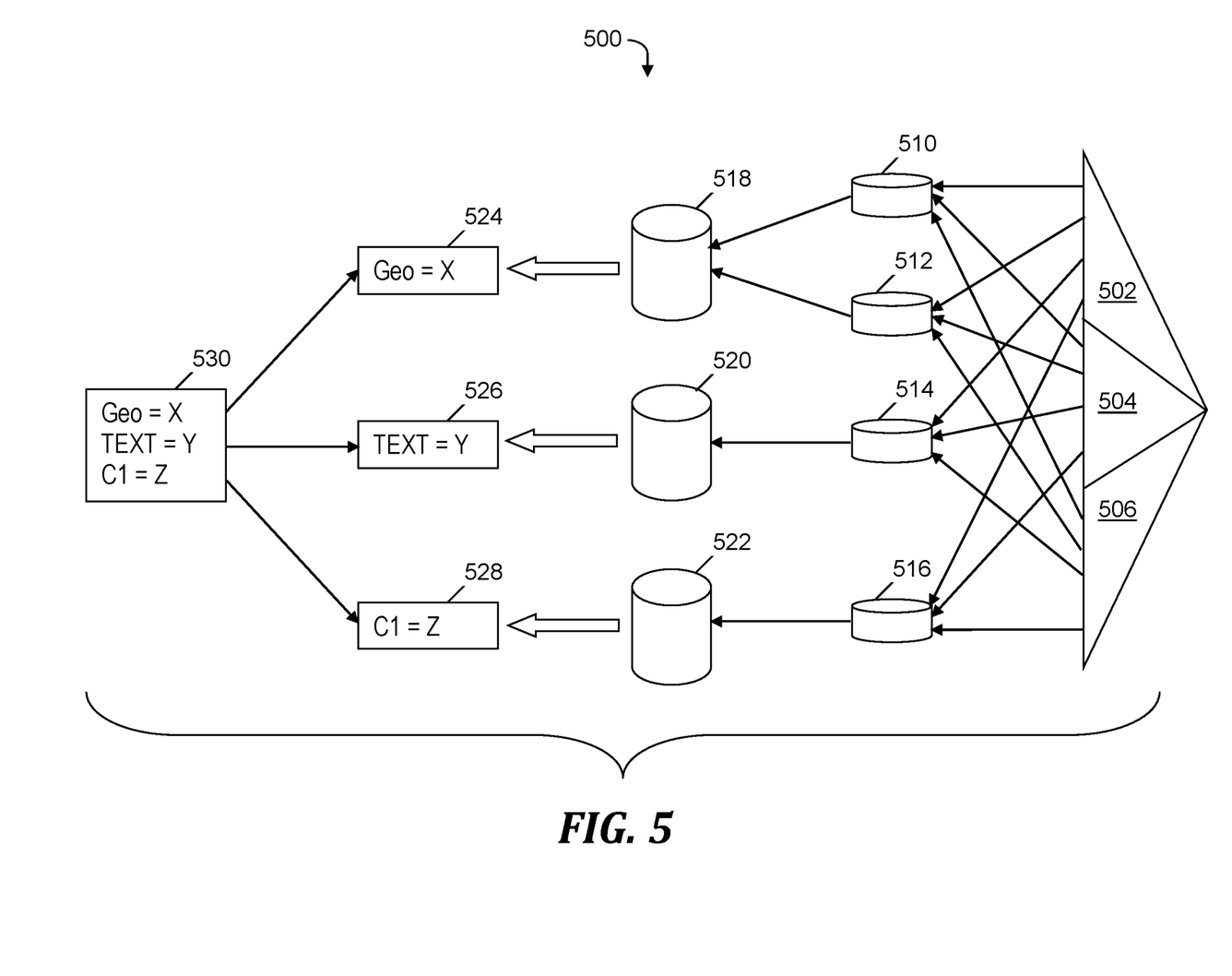
FIG. 5 is an example of generating process tasks divided by a dynamic detection during runtime, where the generation of the execution tasks is included in the process of FIG. 2, in accordance with embodiments of the present invention.

FIG. 5 is an example 500 of generating process tasks divided by a dynamic detection during runtime, where the generation of the execution tasks is included in the process of FIG. 2, in accordance with embodiments of the present invention. Example 500 includes links 502, 504, and 506 to a noSQL database. Example 500 includes logic deviations 510, 512, 514, and 516 generated by query optimizer 106 (see FIG. 1) such that a geospatial index is used to access data via links 502, a full text index is used to access data via link 504, and a b-tree index is used to access data via link 506. Query optimizer 106 (see FIG. 1) generates logic deviations 510, 512, 514, and 516 at runtime.

Runtime structure generator 108 (see FIG. 1) generates work parts 518, 520, and 522 at runtime, where a runtime structure is generated and execution tasks 524, 526, and 528 are dynamically generated (i.e., an originating task 530 is divided into execution tasks 524, 526, and 528 by dynamically determining a corresponding access path by dynamically determining during runtime the most efficient access path (i.e., the index that produces the most filtering). Runtime structure generator 108 (see FIG. 1) generates execution tasks 524, 526, and 528 by using the conditions included in an originating task 530. Pipeline manager 112 (see FIG. 1) combines the initial results produced by execution tasks 524, 526, and 528 to generate final result set 116 (see FIG. 1).

Figure 6:
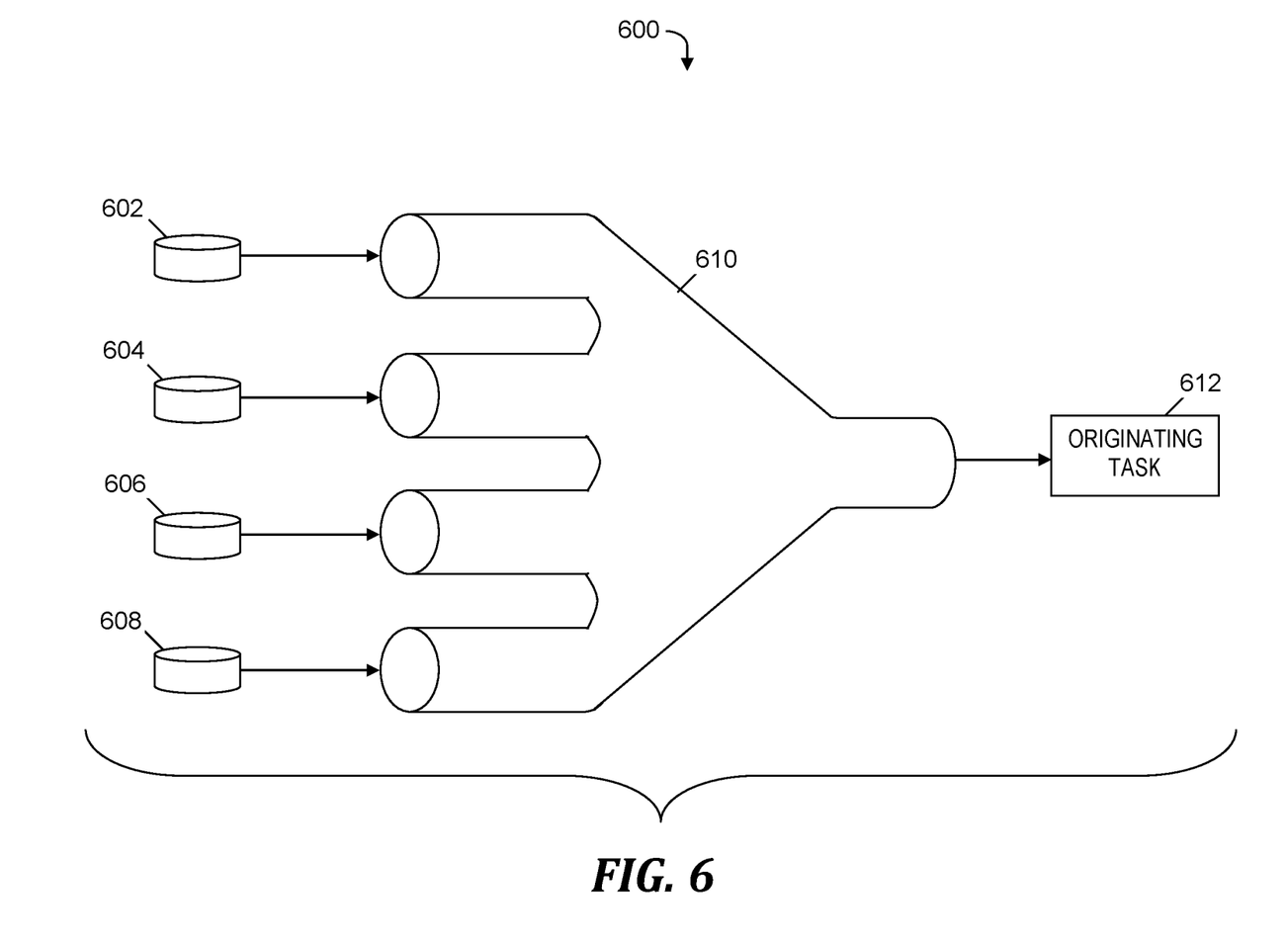
FIG. 6 is an example of accessing records and sending the accessed records to a pipeline manager, where the access and sending of the records is included in the process of FIG. 2, in accordance with embodiments of the present invention.

FIG. 6 is an example 600 of accessing records and sending the accessed records to a pipeline manager, where the access and sending of the records is included in the process of FIG. 2, in accordance with embodiments of the present invention. Example 600 includes unordered data records in initial results generated by using indexes 602, 604, 606, and 608 in the process of FIG. 2 to access data in the database. Task manager 110 (see FIG. 1) sends the data records in the initial results to a pipeline 610 managed by pipeline manager 112 (see FIG. 1). Pipeline 610 combines the initial results into an unordered final result in final result set 116 (see FIG. 1), which is received by an originating task 612 specified by query 114 (see FIG. 1).

Although not shown, example 600 can be modified to include ordered data records in initial results generated by using indexes 602, 604, 606, and 608 in the process of FIG. 2 to access data in the database (i.e., data in each of the initial results is sorted in a specified order). Task manager 110 (see FIG. 1) sends the sorted initial results to pipeline 610, which merges the initial results in the specified order to generate an ordered final result in final result set 116 (see FIG. 1). Pipeline manager 112 (see FIG. 1) sends the ordered final result set 116 (see FIG. 1) to the originating task 612.

Although not shown, in another modification of example 600, pipeline 610 combines initial results that are generated by query performance improvement system 104 (see FIG. 1) processing an outer database table of data depending on the indexes by which the data is divided. For each child task (i.e., execution task), query performance improvement system 104 (see FIG. 1) joins the inner table by a child task group corresponding to a particular index and passes the results of the joins to pipeline 610, which combines the results to generate final result set 116 (see FIG. 1). Query performance improvement system 104 (see FIG. 1) sends final result set 116 (see FIG. 1) to a parent task (i.e., the originating task 612 in the modification of example 600).

Computer System

Figure 7:
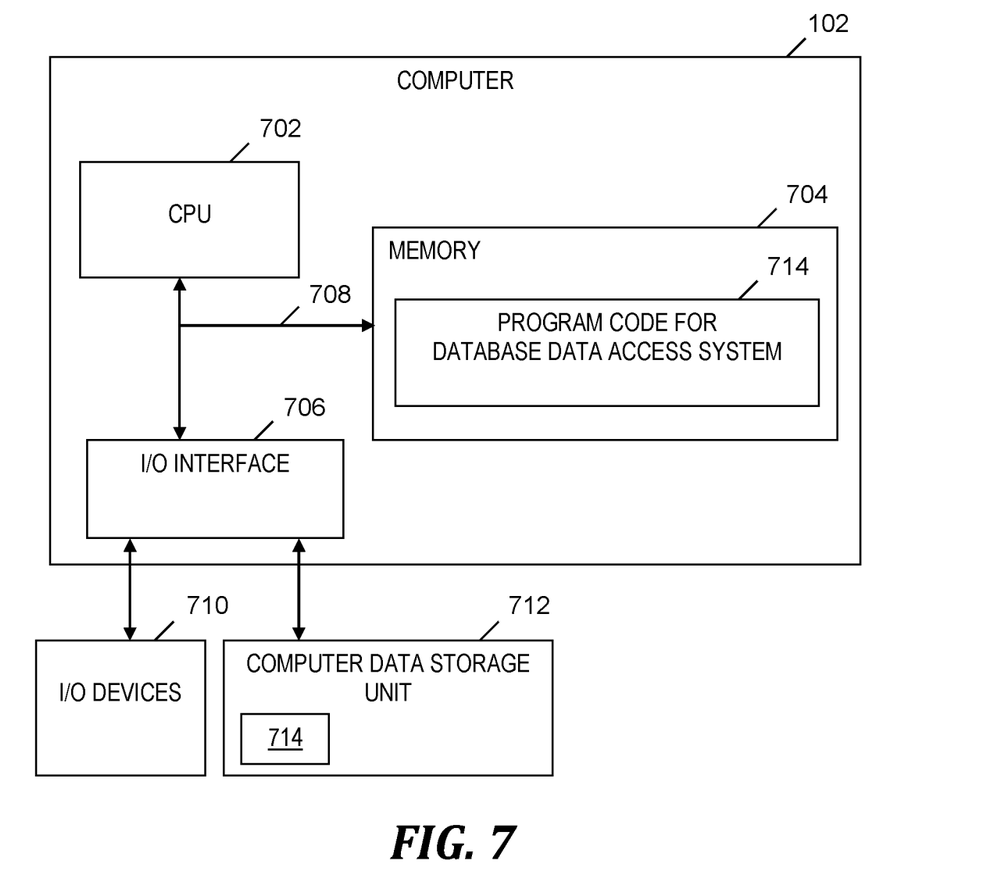
FIG. 7 is a block diagram of a computer included in the system of FIG. 1 and that implements the process of FIG. 2, in accordance with embodiments of the present invention.

FIG. 7 is a block diagram of a computer included in the system of FIG. 1 and that implements the process of FIG. 2, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for query performance improvement system 104 (see FIG. 1) to perform a method of accessing data in a database, where the instructions are executed by CPU 702 via memory 704. CPU 702 may include a single processing unit or be distributed across one or more processing units in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer readable storage medium, which is described below. In one embodiment, computer data storage unit 712 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 704 and/or storage unit 712 may store computer program code 714 that includes instructions that are executed by CPU 702 via memory 704 to access data in a database. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

In one embodiment, computer data storage unit 712 includes a data repository of query statistics received by query performance improvement system 104 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to accessing data in a database. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to access data in a database. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of accessing data in a database.

While it is understood that program code 714 for accessing data in a database may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of accessing data in a database. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of accessing data in a database, the method comprising:
    receiving, by one or more processors, a query which accesses one or more items included in data in a database, the query having multiple conditions whose execution produces a final result of the query;

determining, by the one or more processors, amounts of filtering of portions of the data in the database caused by utilizing different types of indexes to filter the portions, respectively;

determining, by the one or more processors, respective greatest amounts of filtering for the portions, the greatest amounts of filtering being included in the amounts of filtering;

selecting, by the one or more processors, respective types of indexes so that a utilization of a given type of index causes a greatest amount of filtering for a given portion;

based on the selected types of indexes, generating, by the one or more processors, respective data access methods for the portions of the data;

during runtime, generating, by the one or more processors, respective process tasks for the multiple conditions in the query;

controlling, by the one or more processors, an execution flow that executes the process tasks by utilizing the respective data access methods to generate respective initial results; and generating, by the one or more processors, the final result of the query by combining the initial results from the process tasks.

2. The method of claim 1, further comprising receiving, by the one or more processors, statistics of the database, wherein the generating the respective data access methods is further based on the received statistics.

3. The method of claim 1, further comprising:
generating, by the one or more processors, access paths for the portions so that the access paths correspond to the greatest amounts of filtering for the portions and to the types of indexes; and
dynamically accessing, by the one or more processors, one of the generated access paths to execute the query, which improves a performance of the query.

4. The method of claim 1, wherein the determining the amounts of filtering, the determining the respective greatest amounts of filtering, the selecting the respective types of indexes, the generating the respective data access methods, the generating the respective process tasks, the controlling the execution flow, and the generating the final result by combining the initial results reduce a usage of system resources by an execution of the query.

5. The method of claim 1, further comprising:
dividing, by the one or more processors, the data in the database into partitions so that the partitions are non-overlapping, wherein the portions are the partitions; and
dividing, by the one or more processors, an originating task associated with the query into multiple process tasks so that each process task is associated with a corresponding partition included in the partitions.

6. The method of claim 1, further comprising:
determining, by the one or more processors, that the indexes have identical prefixes;
in response to the determining that the indexes have the identical prefixes, dividing, by the one or more processors, the data in the database into non-overlapping key ranges; and
dividing, by the one or more processors, an originating task associated with the query into multiple process tasks so that each process task is associated with a corresponding key range included in the non-overlapping key ranges.

7. The method of claim 1, further comprising:
generating, by a runtime generator, relationships between an originating task associated with the query and the process tasks; and
based on the relationships, generating, by the runtime generator, a runtime structure, wherein the controlling the execution flow is based on the runtime structure.

8. The method of claim 1, further comprising:
providing at least one support service for at least one of creating, integrating, hosting, maintaining, and deploying computer readable program code in the computer, the program code being executed by a processor of the computer to implement the receiving the query, the determining the amounts of filtering of the portions of the data in the database, the determining the respective greatest amounts of filtering for the portions, the selecting the respective types of indexes, the generating the respective data access methods for the portions of the data, the generating the respective process tasks for the multiple conditions in the query, the controlling the execution flow, and the generating the final result of the query by combining the initial results from the process tasks.

9. A computer program product comprising:
a computer readable storage medium having computer readable program code stored on the computer readable storage medium, the computer readable program code being executed by a central processing unit (CPU) of a computer system to cause the computer system to perform a method comprising the steps of:
the computer system receiving a query which accesses one or more items included in data in a database, the query having multiple conditions whose execution produces a final result of the query;
the computer system determining amounts of filtering of portions of the data in the database caused by utilizing different types of indexes to filter the portions, respectively;
the computer system determining respective greatest amounts of filtering for the portions, the greatest amounts of filtering being included in the amounts of filtering;
the computer system selecting respective types of indexes so that a utilization of a given type of index causes a greatest amount of filtering for a given portion;
based on the selected types of indexes, the computer system generating respective data access methods for the portions of the data;
during runtime, the computer system generating respective process tasks for the multiple conditions in the query;
the computer system controlling an execution flow that executes the process tasks by utilizing the respective data access methods to generate respective initial results; and
the computer system generating the final result of the query by combining the initial results from the process tasks.

10. The computer program product of claim 9, wherein the method further comprises the computer system receiving statistics of the database, wherein the generating the respective data access methods is further based on the received statistics.

11. The computer program product of claim 9, wherein the method further comprises:

the computer system generating access paths for the portions so that the access paths correspond to the greatest amounts of filtering for the portions and to the types of indexes; and the computer system dynamically accessing one of the generated access paths to execute the query, which improves a performance of the query.

12. The computer program product of claim 9, wherein the determining the amounts of filtering, the determining the respective greatest amounts of filtering, the selecting the respective types of indexes, the generating the respective data access methods, the generating the respective process tasks, the controlling the execution flow, and the generating the final result by combining the initial results reduce a usage of system resources by an execution of the query.

13. The computer program product of claim 9, wherein the method further comprises:

the computer system dividing the data in the database into partitions so that the partitions are non-overlapping, wherein the portions are the partitions; and the computer system dividing an originating task associated with the query into multiple process tasks so that each process task is associated with a corresponding partition included in the partitions.

14. The computer program product of claim 9, wherein the method further comprises:

the computer system determining that the indexes have identical prefixes;

in response to the determining that the indexes have the identical prefixes, the computer system dividing the data in the database into non-overlapping key ranges; and the computer system dividing an originating task associated with the query into multiple process tasks so that each process task is associated with a corresponding key range included in the non-overlapping key ranges.

15. A computer system comprising:

a central processing unit (CPU);

a memory coupled to the CPU; and a computer readable storage medium coupled to the CPU, the computer readable storage medium containing instructions that are executed by the CPU via the memory to implement a method comprising the steps of:

the computer system receiving a query which accesses one or more items included in data in a database, the query having multiple conditions whose execution produces a final result of the query;

the computer system determining amounts of filtering of portions of the data in the database caused by utilizing different types of indexes to filter the portions, respectively;

the computer system determining respective greatest amounts of filtering for the portions, the greatest amounts of filtering being included in the amounts of filtering;

the computer system selecting respective types of indexes so that a utilization of a given type of index causes a greatest amount of filtering for a given portion;

based on the selected types of indexes, the computer system generating respective data access methods for the portions of the data;

during runtime, the computer system generating respective process tasks for the multiple conditions in the query;

the computer system controlling an execution flow that executes the process tasks by utilizing the respective data access methods to generate respective initial results; and the computer system generating the final result of the query by combining the initial results from the process tasks.

16. The computer system of claim 15, wherein the method further comprises the computer system receiving statistics of the database, wherein the generating the respective data access methods is further based on the received statistics.

17. The computer system of claim 15, wherein the method further comprises:

the computer system generating access paths for the portions so that the access paths correspond to the greatest amounts of filtering for the portions and to the types of indexes; and the computer system dynamically accessing one of the generated access paths to execute the query, which improves a performance of the query.

18. The computer system of claim 15, wherein the determining the amounts of filtering, the determining the respective greatest amounts of filtering, the selecting the respective types of indexes, the generating the respective data access methods, the generating the respective process tasks, the controlling the execution flow, and the generating the final result by combining the initial results reduce a usage of system resources by an execution of the query.

19. The computer system of claim 15, wherein the method further comprises:

the computer system dividing the data in the database into partitions so that the partitions are non-overlapping, wherein the portions are the partitions; and the computer system dividing an originating task associated with the query into multiple process tasks so that each process task is associated with a corresponding partition included in the partitions.

20. The computer system of claim 15, wherein the method further comprises:

the computer system determining that the indexes have identical prefixes;

in response to the determining that the indexes have the identical prefixes, the computer system dividing the data in the database into non-overlapping key ranges; and the computer system dividing an originating task associated with the query into multiple process tasks so that each process task is associated with a corresponding key range included in the non-overlapping key ranges.

\* \* \* \* \*